United States Patent

Brink et al.

[15] 3,642,617
[45] Feb. 15, 1972

[54] FOAM FLOTATION CONCENTRATOR

[72] Inventors: Edwin H. Brink, San Jose; Warren G. Palmer, Saratoga, both of Calif.

[73] Assignee: FMC Corporation, San Jose, Calif.

[22] Filed: Jan. 29, 1970

[21] Appl. No.: 6,868

[52] U.S. Cl. .............................. 210/44, 209/170, 210/205, 210/221, 252/61
[51] Int. Cl. .......................................................... B03d 1/00
[58] Field of Search ................. 209/170; 210/44, 205–210, 210/220, 221; 252/61

[56] References Cited

UNITED STATES PATENTS

| R26,449 | 9/1968 | Bradt | 210/44 |
| 1,157,176 | 10/1915 | Owen | 252/61 X |
| 1,505,944 | 8/1924 | Broadbridge et al. | 210/44 |
| 2,248,177 | 7/1941 | Karlstrom | 210/205 |
| 2,713,026 | 7/1955 | Kelly et al. | 210/221 |
| 2,778,499 | 1/1957 | Chamberlain et al. | 210/44 X |

Primary Examiner—Reuben Friedman
Assistant Examiner—Thomas G. Wyse
Attorney—F. W. Anderson and C. E. Tripp

[57] ABSTRACT

A suspension of activated sludge from a secondary settling tank is concentrated by a bubble flotation process. Air is forced through a mixture of water and a surfactant in a shear-type foamer at low pressure to produce a stable foam of small air bubbles in water. The foam is pumped into the suspension entering the concentrator and the bubbles attach to the solids in the suspension. The mixture of foam and suspension is released within a baffle in the concentrator tank, causing the surfactant shielded air bubbles to lift the solids to which they have become attached and form a blanket of concentrated sludge. A rotating skimmer head removes an upper layer of the sludge blanket whereas the clarified effluent flows under the baffle and out over an annular weir for discharge. The concentrated sludge removed from the concentrator is introduced into an anaerobic digester, along with primary sludge from the primary settling tank of the system. One overall effect is to reduce the size required for the digester.

8 Claims, 7 Drawing Figures

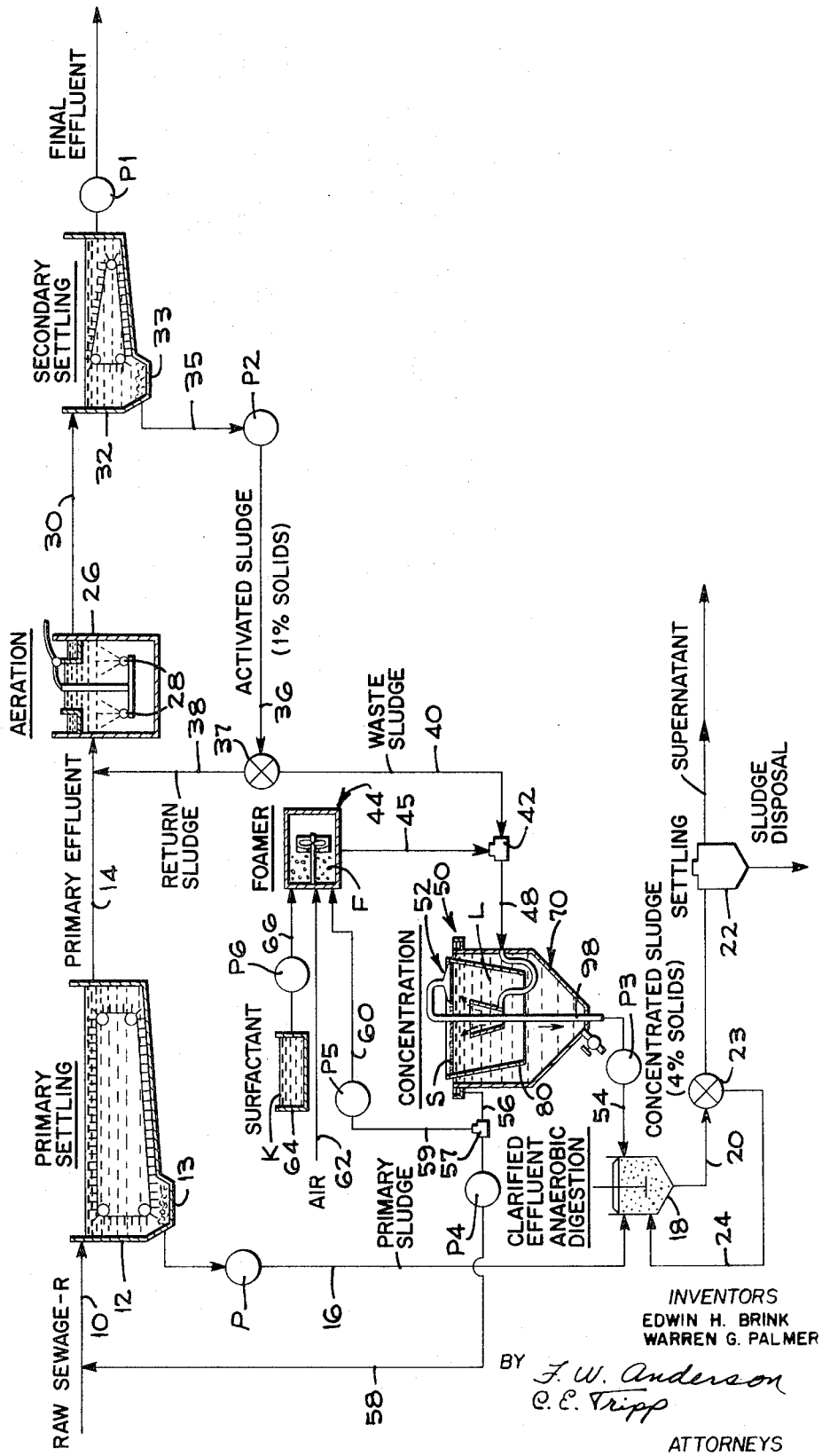

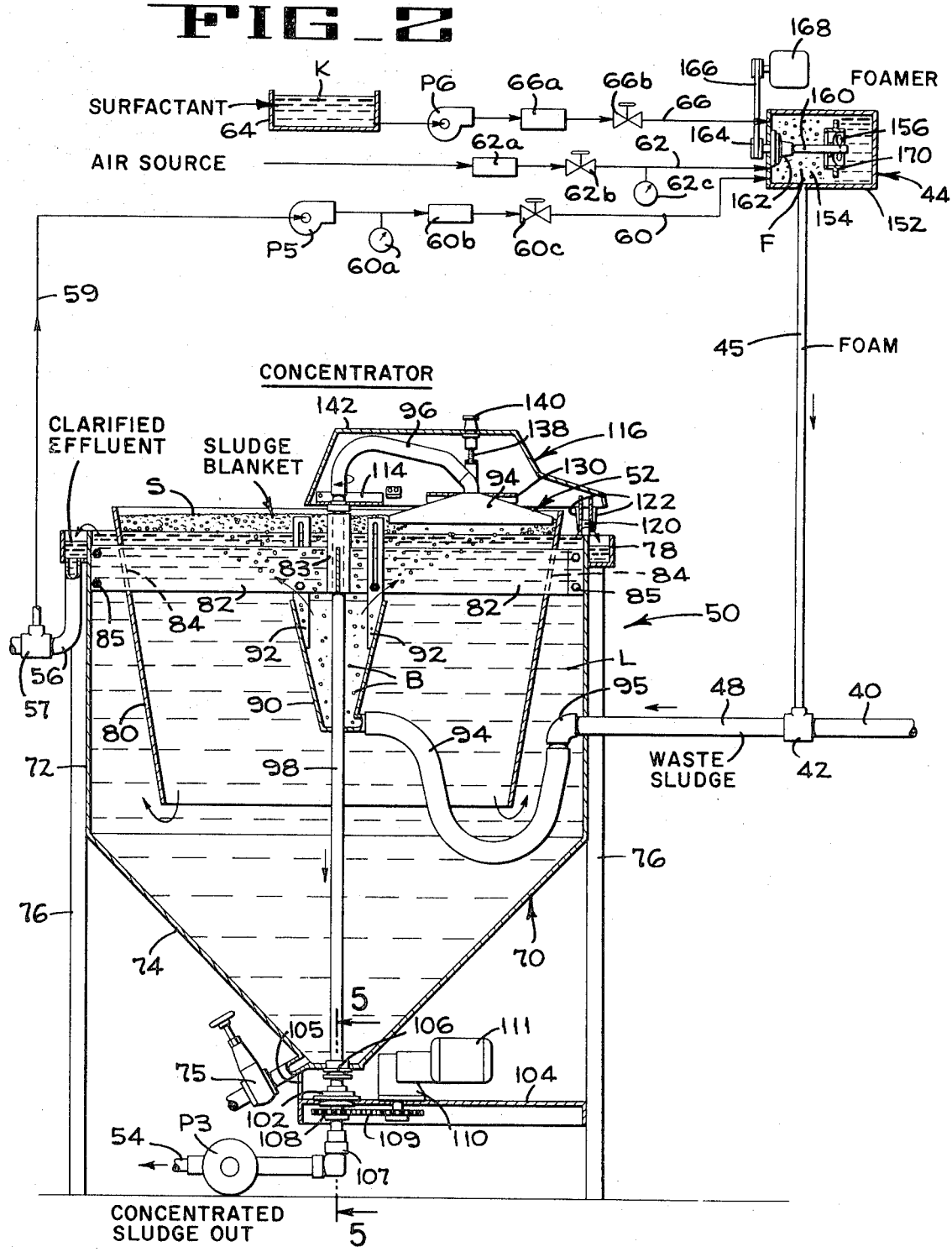

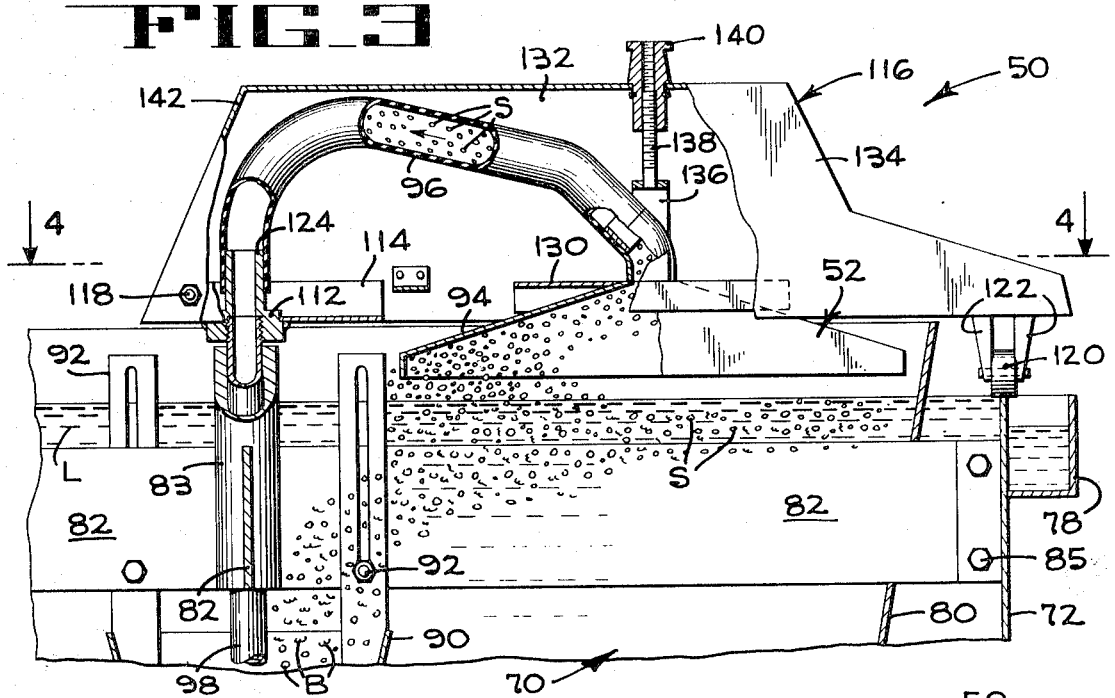
FIG_3
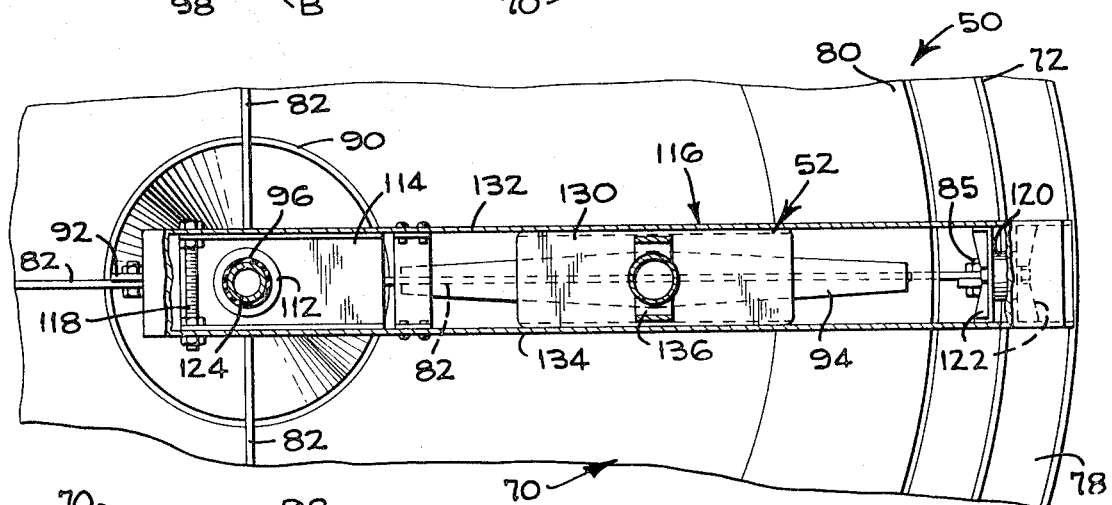
FIG_4
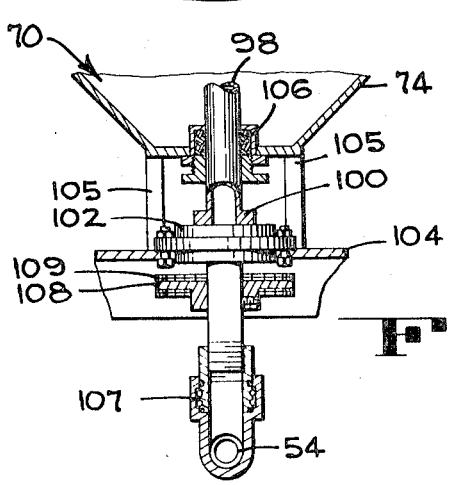
FIG_5

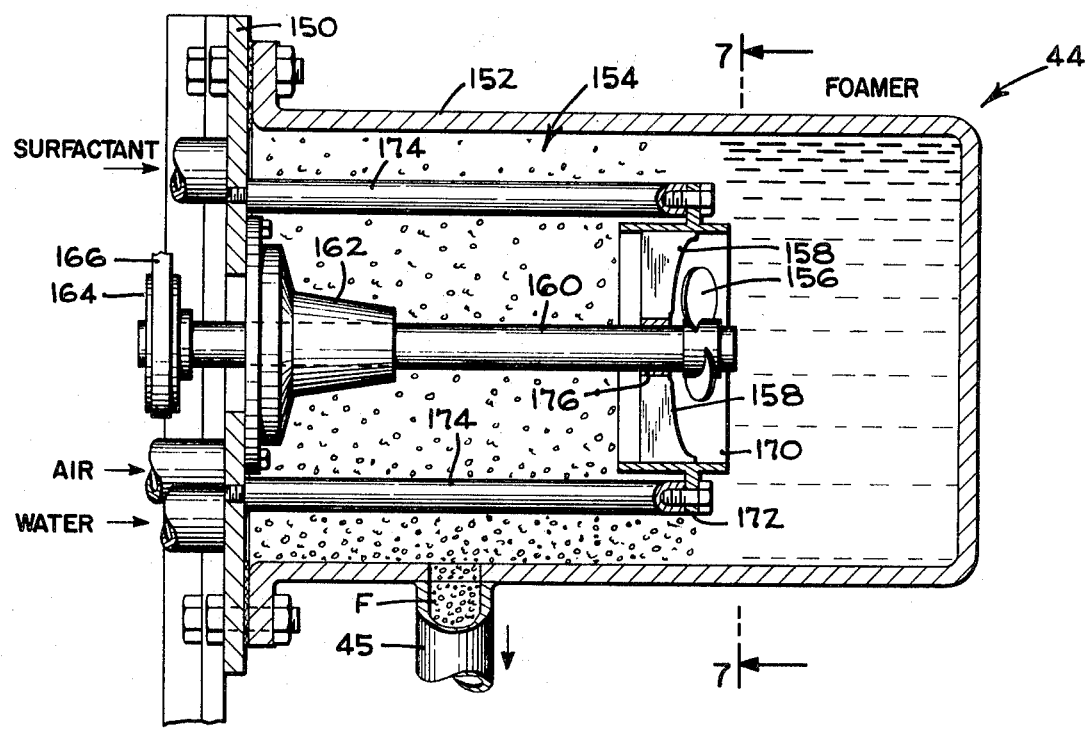
FIG_6
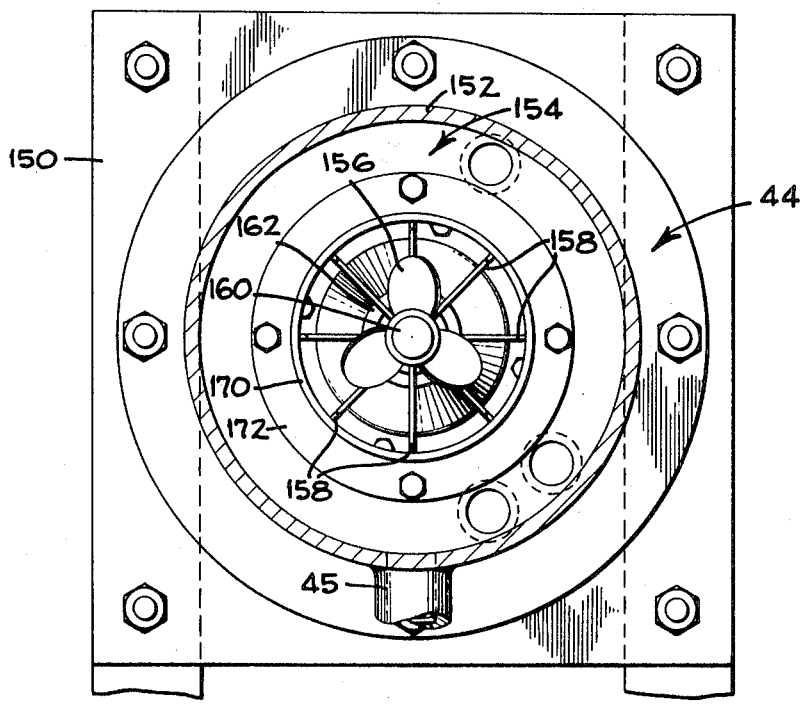
FIG_7

FOAM FLOTATION CONCENTRATOR

REPRESENTATIVE PRIOR ART

Although the most pertinent prior art known to applicant relative to foam flotation is not directed to the problem of concentrating sludge from sewage waste, it is believed that the nature of the present invention will be understood when it is compared briefly with the representative prior flotation systems.

The United States Pat. to Juel No. 2,765,919, is representative of the well-known "dissolved air" flotation system used in the paper pulp industry. In this system chemicals (but not surfactants) such as aluminum sulphate or glue or milk of lime are added to the suspension in a mixing eductor, along with air from an injector. The suspension to be clarified flows to a pump. The suspension and air-chemical mixture are pumped into a retention tank which is pressurized behind an expansion valve so that the injected air dissolves in the suspension. The suspension is then released in the inlet chamber of the flotation tank through the expansion valve so that the released and rising bubbles will lift the suspended pulp. This system requires that the entire stream be pumped against the pressure of the retention tank. Also there is no opportunity for air bubbles to contact the suspension before release through the expansion valve. Furthermore, there is always some dissolved air which introduces large bubbles along with small bubbles and hence requires a separate inlet chamber at the main flotation tank. The use of a surfactant in the Juel system would act as a barrier to gas transfer (solution) into the water for ultimate release as bubbles. It has been found to require about 15 c.c. of air in the form of bubbles to float 1 gram of activated sludge in sewage waste. To obtain this amount of dissolved air in the Juel system would require a substantial recycling of the suspension after air has been introduced into it to give the total air requirement.

Another flotation system that employs air bubbles is shown in the laundry waste clarifier of Halton U.S. Pat. No. 3,147,317. In this reference, laundry waste is pumped to a heater and then through a venturi aspirator which receives alum as a flocculator. The suspension goes through another venturi injector which receives a mixture of compressed air and clarified water. After passing through these injectors the laundry waste is bubbled into a baffle within the flotation tank. The two injectors required in the system introduce a head-loss and hence require considerable pumping power. Also, they produce coarse bubbles (not a foam). The injectors must operate under high velocity, large water flow conditions to produce a mixing action which in turn requires the addition of a large amount of air, more than can be normally contained as small bubbles, without recirculating a substantial amount of the suspension to which air has been introduced.

Another flotation system is shown in Chamberlain et al. U.S. Pat. No. 2,778,499 for the flotation of coal screenings from washings. In this system a pump circulates the suspension and added agents into and out of the flotation tank. A frothing agent (cresylic acid), a conditioning agent (oil), and air are added to the suspension. This mixture does not produce fine, surfactant shielded bubbles to float organic material such as sludge from sewage waste.

SUMMARY OF THE INVENTION

The flotation concentrator embodiment described herein concentrates excess or waste sludge from a secondary treatment tank in a sewage treatment system, but the principles apply to the flotation of other solids such as cannery waste, various slurries, ores, etc. The concentrated solids are fed to the anaerobic digester, the net effect of the invention being that the digester can be decreased in size as compared to the same system without the concentration.

In the foam flotation concentrator system of the present invention, the pressure on the suspension to be clarified (sewage waste) need only be high enough to overcome the gravity head on the flotation tank. Air is trapped in surfactant-shielded bubbles as a foam. The foam is generated by mixing a relatively small quantity of water (which may be either tap water or recirculated water but at any event the quantity is small), a surfactant and air under pressure just high enough to overcome the head of the flotation tank. These agents are introduced into a shear foamer in a manner which produces a foam of very fine bubbles. The foam is fully developed before it is introduced into the incoming suspension stream, hence the amount of surfactant required is relatively small, as compared to systems wherein flocculents are merely injected or aspirated directly into the incoming suspension or into the flotation tank. Although the additive requirements are small in the present system, the foam will float out small organic solids, such as sewage sludge, in the suspension with efficiency, with little pumping power, and with low chemical cost.

As mentioned, under the present invention, air is entrained in a relatively small quantity of water containing a surfactant. This forms a foam of air bubbles that is stable and does not coalesce. These bubbles (foam) are added to the suspension as bubbles before the suspension is released in a tank. This addition of the foam to the incoming suspension provided for precontact and attachment between the air bubbles and the solids in the suspension, thereby increasing the flotation action that takes place when the suspension is ultimately released in the tank. Incidentally, the same bubble (foam) characteristics which provide stable small bubbles also insure that these bubbles remain small and uncoalesced, as the foam is pumped into the incoming suspension.

Another aspect of the present invention relates to its use in sewage systems. In the latter, activated sludge from a aerator-secondary settling system is returned from the settler to the aerator as "seed" sludge. During a given operational period the activated sludge increases in volume by metabolic growth of micro-organisms. The volume increase in the activated sludge represents "waste" sludge, and this fraction of the return sludge has been introduced into the primary settling tank along with the incoming raw sewage. The waste sludge contains about 1 percent solids in suspension and since this suspension settled out in the secondary settling tank, in prior systems it will also settle out as a 1 percent suspension in the primary settling tank.

As mentioned, the settleable suspension in the primary settling tank is fed to an anaerobic digester, so that the waste sludge previously returned to primary settling from secondary settling can only be delivered to the anaerobic digester in the form of a 1 percent solids suspension. Thus the anaerobic digester in these prior systems must be large enough to handle the primary volume settled out in primary settling plus the volume of dilute returned waste sludge.

Under the present invention, the 1 percent solids waste sludge (1 percent solids) is concentrated four times, so that it contains about 4 percent solids. This concentration is high enough to permit the concentrated waste sludge to be fed directly to the anaerobic digester, and only water from which the sludge has been removed in the concentrator is returned to settling. This returned water does not pass through the anaerobic digester, as it would as part of the returned sludge when no concentrator is employed.

The result of all this is, that in a sewage system employing foam concentration of the present invention, the anaerobic digester can be made to handle a smaller total liquid volume thereby providing economies in original equipment cost as well as a reduction in daily operating expenses.

BRIEF DESCRIPTION OF THE DRAWINGS

FIG. 1 is a diagram showing an embodiment of the invention incorporated in a sewage disposal system.

FIG. 2 is a section through the sludge concentrator of the present invention, the diagram showing various connections to the concentrator.

FIG. 3 is an enlarged fragmentary section of the concentrator showing the sludge pickup head.

FIG. 4 is a view of the concentrator taken on line 4—4 of FIG. 3.

FIG. 5 is a partial section through the concentrator taken on line 5—5 of FIG. 2.

FIG. 6 is an enlarged section through the foamer.

FIG. 7 is a section of the foamer taken on line 7—7 of FIG. 6.

DETAILED DESCRIPTION OF PREFERRED EMBODIMENT

FIG. 1 is a diagram showing the present invention connected into a typical sewage treatment plant of the activated sludge type, now in general use. The details of the sewage treatment plants are not critical to the invention and hence they are shown diagrammatically and will be described in a general way.

As seen in FIG. 1, raw sewage R (from which grit and other solids have been removed) is introduced into the system by line 10 leading into a primary settling tank 12, wherein the primary sludge settles to a basin 13. The partially clarified primary effluent is drawn off through a line 14. The primary sludge is pumped by a pump P through line 16 into an anaerobic digestion tank 18 wherein the sludge enters anaerobic digestion in a known manner.

The digested sludge is withdrawn from the anaerobic digestion tank 18 through line 20 and introduced to a settling tank 22 where the sludge is permitted to settle. From the settling tank 22 the dewatered, settled sludge is removed for disposal. The supernatant liquid is withdrawn and may be reintroduced into the system for use in accordance with known techniques. Part of the digested sludge suspension is returned to the digester 18 by a proportioning valve 23 and a return line 24. An anaerobic digestion system of the type just described and its relation to a sewage treatment plant is disclosed in detail in the U.S. Pat. to Forest No. 2,777,819, Jan. 15, 1967.

The primary effluent line 14 from the settling tank 12 connects to an aeration tank 26 containing air diffusers 28 which provide the oxygen required by the organisms in the aeration tank. The aerated mixed liquors from the aeration tank 26 are withdrawn through a line 30, and passed to a secondary settling tank 32. Here, activated sludge solids in suspension settle out into a catch basin 33. The final effluent is pumped out by a pump P1 for disposition in the usual manner. The activated sludge solids from the catch basin 33 is pumped out through a line 35 by a pump P2 and returned to the system by a line 36 as activated sludge. In normal practice and by way of example, the activated sludge removed from secondary settling will contain in the order of 1 percent solids by weight.

The activated sludge in line 36 passes through a proportioning valve 37 and the majority of that sludge (about 90 percent thereof) flows through line 38 as "Return Sludge" which joins the primary effluent line 14 leading into the aeration tank 26. This practice is conventional and the return sludge is employed as seen sludge.

However, a certain amount of activated sludge withdrawn from the catch basin 33 of the secondary settling tank 32 in excess or "Waste Sludge" and in prior practice, this material has been returned to the system by reintroducing it to the primary settling tank 12. As mentioned, in prior systems when this waste sludge settled out into the catch basin 13 of the primary settling tank (just as it did in the catch basin 33 of the secondary settling tank), it would contain only 1 percent solids and as such would have been introduced via the line 16 to the anaerobic digester 18.

Under the present invention, however, the waste sludge in line 40 is concentrated to a concentration of about 4 percent solids before it was introduced into the anaerobic digestion tank 18.

More specifically, in accordance with the present invention the waste sludge (about 10 percent of the activated sludge withdrawn from secondary settling) in line 40 is introduced into a pipe T 42, wherein it is mixed with foam F generated in a shear-type foamer 44. The foam F is pumped out of the foamer by the action of the foamer itself through a foam delivery line 45 connected to the pipe T 42. Thus, a mixture of foam and waste sludge is introduced into a line 48 leading to a sludge concentration device 50 of the present invention. In the concentrator 50, a blanket of sludge S is formed and floats on top of the clarified liquid L within the concentrator. This blanket S of concentrated sludge now contains about 4 percent solids by weight, and is withdrawn through a rotating skimmer head 52 and pumped by P3 into a line 54 that connects into the anaerobic digester 18 previously described.

As previously mentioned, in view of the concentrating action of the sludge concentration device 50 (to be described presently) the liquid volume that must pass through the anaerobic digestion process in the digester 18 is reduced over that of prior systems, and hence the digester 18 can be made smaller than that required in prior installations.

The liquid L below the sludge blanket S in the sludge concentrator 50 is withdrawn as clarified effluent from an overflow line 56 leading to a pipe T 57, and most of the clarified effluent is pumped by a pump P4 through a line 58, back to the raw sewage admission line 10 previously mentioned. A portion of the clarified effluent from the concentrator 50 is also withdrawn from the line 56 via the pipe T 57, a line 59 and a pump P5 and introduced into the foamer 44 by a line 60. This water serves as the primary liquid phase in the foam F. A metered amount of air is also introduced into the foamer by means of a line 62. A surfactant K is pumped by a pump P6 from a surfactant source 64 into the foamer through a line 66. As will be described presently, the foamer 44 is constructed and operated to produce a stable foam having fine bubbles which provide an efficient sludge lifting and concentrating action in the concentrator 50.

THE CONCENTRATOR

The concentrator 50 and the connections thereto are shown in the diagram of FIG. 2. Additional details of the concentrator appear in the sections of FIGS. 3–5.

The concentrator comprises a tank indicated generally at 70 which has a cylindrical upper portion 72 and a conical bottom 74 with a drain valve 75. The tank is supported on legs 76. Clarified effluent flows over the upper edge of the cylindrical tank portion 72 into a collector ring 78 from which the clarified effluent is withdrawn by the line 56 previously mentioned. A frustoconical baffle 80 is mounted within the cylindrical portion 72 of the concentrator tank and the upper end of this baffle projects above the level of the liquid L in the tank. The baffle 80 is supported from the cylindrical tank portion 72 by means of brackets 82 that extend radially from a central sleeve 83, and project through slots 84 (FIG. 2) in the baffle. The ends of the brackets 82 are secured at 85 to the sidewall 72 of the tank.

The foam F is admitted to the tank within the baffle 80 somewhat below the surface of the tank liquid L. The foam is admitted by a conical diffuser or nozzle 90 adjustably suspended from the brackets 82, on slotted legs 92. The lower end of the foam diffuser 90 is connected by means of a flexible hose 94 and an elbow 95 to the waste sludge inlet line 48 previously described.

In operation of the unit, the sludge blanket S of concentrated solids is formed as air bubbles B (FIGS. 2 and 3) formed in the diffuser 90 rise, and lift suspended solids to the top of the liquid L. The sludge blanket S floats on the surface of the liquid Level L. An upper layer of the blanket of sludge is removed by a rotating suction pickup head 94 (FIG. 3) connected to a flexible sludge withdrawal line 96. The flexible line 96 connects to a vertical withdrawal pipe 98 passing through the axis of the tank and the lower end of the line 98 makes connection with the concentrated sludge withdrawal line 54 (FIGS. 1 and 2) previously mentioned and leading to the anaerobic digester (FIG. 1), as will be described presently.

VACUUM HEAD CONSTRUCTION

The vacuum head and sludge withdrawal features of the invention are shown in FIGS. 2-5. The sludge withdrawal pipe 98 extends through the bracket sleeve 83 and down the axis of the tank 70, and is rotated to sweep the sludge pickup head 94 around the sludge blanket S at the top of the tank, as previously mentioned. The sludge withdrawal pipe 98 also supports the vacuum head assembly at the bottom of the tank 70, as seen in FIG. 5. This support is by means of a flange 100 near the lower end of the pipe 98 which flange is supported on a conventional thrust bearing 102. The thrust bearing is mounted in a plate 104 which is supported by one of the legs 76 (FIG. 2) and by brackets 105 (FIG. 5) depending from the lower portion of the tank. The rotating pipe 98 extends through a packing gland 106 (FIG. 5) to seal the liquid within the tank.

The lower end of the vertical pipe 98 connects to a swivel joint 107 (FIGS. 2 and 5) which makes connection with the sludge discharge pipe 54. The swivel joint 107 is provided with a rotary fluid seal and is of conventional construction, the design details not being critical to the present invention.

As mentioned, the pipe 98 is rotated in order to sweep the vacuum head around the sludge blanket S by means of a sprocket 108 (FIG. 5) secured to the pipe between the bearing 102 and the swivel joint 107. As seen in FIG. 2, the sprocket 108 is driven by chain 109 which in turn is driven by a sprocket depending from a right angle gear box 110 and operated by a sweep motor 111.

Referring to FIGS. 3 and 4, the sludge withdrawal pipe 98 projects upwardly through the sleeve 83 (FIG. 3) mounted on the cross brackets 82 previously mentioned. This sleeve serves as a bearing for guiding the pipe 98 as it is rotated.

A combined hood mounting bracket and flexible pipe connection assembly is supported by the upper end of the pipe 98. In the construction shown, a collar 112 (FIG. 3) is threaded to receive the upper end of the pipe 98 and this collar is welded to a hood support bracket 114. A combined hood and pickup head support 116 is hingedly supported from the bracket 114 by a pivot bolt 118. The outer end of the hood 116 is supported by a roller 120 mounted in depending legs 122 secured to the hood. The roller 120 rides on the upper edge of the cylindrical portion 72 of the tank 70. The flexible sludge withdrawal line 96 previously mentioned is clamped over a nipple 124 that projects upwardly from the collar 112, previously described as being threaded onto the upper end of the sludge withdrawal pipe 98.

Means are provided for a vertical adjustment of the sludge withdrawal head 94 and to accommodate operational conditions relating to the thickness of the sludge blanket S floating on top of the liquid L in the tank. In the embodiment shown, the upper side of the sludge withdrawal head 94 is welded to a channel-shaped guide shoe 130 which slidably fits between the side flanges 132, 134 of the hood 116. A U-shaped bracket 136 is welded to and projects upwardly from the shoe 130 and an adjustment screw 138 is welded to and projects upwardly from the bracket (FIG. 3). A captive adjustment nut 140 is threaded onto the screw 138 and is rotatably mounted in the top plate 142 of the hood, 116. Thus, as seen in FIG. 3, manual rotation of the captive adjustment nut 140 will raise and lower the vacuum sludge withdrawal head 94 and hence adjust the latter for pickup of a sludge layer of the desired thickness from the sludge blanket S. The pump P3 (FIG. 2) creates the vacuum necessary at the head 52 for sludge blanket withdrawal.

THE FOAMER

The foamer 44 is shown in detail in FIGS. 6 and 7. This is a shear-type foamer which when supplied with surfactant, air and water in the proper proportions and at the correct flow rates and when rotated at the proper speed, pumps an adequate volume of stable, fine bubble foam F attaching to and lifting the organic solids suspended in the liquid in the tank of the concentrator, to form the sludge blanket S as previously described.

The foamer 44 includes a combined mounting bracket and end plate 150 to which is bolted the foamer housing 152 for forming chamber 154. The shear-type foam-generating mechanism includes a rotating propeller blade 156 and cooperating stator blades 158 are mounted within the foaming chamber. The propeller blade 156 is secured to a shaft 160 which projects outwardly through a combined bearing and packing assembly 162 on the end plate 150 (FIG. 6), the details of which are not critical to the present invention. The projecting outer end of the shaft 160 mounts a V-belt pulley 164 to be driven by a V-belt 166 and a foamer motor and pulley assembly 168 (FIG. 2). The stator blades 158 previously mentioned are secured at their outer ends to a shroud 170 having a radial flange 172 bolted to posts 174 projecting into the foaming chamber 154 from the end plate 150. The inner ends of the stator blades 158 connect to a collar 176 which guides the propeller shaft 160 just inside of the propeller 166.

The surfactant K leaving the surfactant supply chamber 64 (FIG. 2) is introduced by the pump P6 and passes through a flow rate indicator 66a of known design. The rate of flow is adjusted by a valve 66b in accordance with the required operating conditions.

The air introduced through the line 62, comes from a source of compressed air of conventional design not shown. An air flow meter 62a indicates the rate of flow of air as determined by an adjustment valve 62b and the pressure of the air entering the line 62 can be observed on a gauge 62c.

The amount of clarified effluent withdrawn from the line 59 by the pump P5 and entering the foamer 44 is likewise controlled. A pressure gauge 60a indicates the pressure of the incoming water, and the flow rate thereof appears on a flow indicator 60b of conventional design. The flow rate of the incoming water in line 60 can be adjusted by a manual valve 60c.

Upon rotation of the propeller shaft 160 at about 5,000 r.p.m. and upon admission of surfactant air and water to the former chamber, an aggressive shearing and pumping action is provided which generates and pumps an adequate quantity of stable, fine bubble foam within the chamber and forces the foam F out of the line 45 for joining the incoming waste sludge being directed into the concentrator 50, all as seen in FIGS. 1 and 2.

SURFACTANT

Some mention will be made of the surfactant employed under the present invention. The surfactant is essential in order to maintain the useful life of small bubbles between the time when the foam is generated and when the bubbles are released in the flotation tank. Small gas bubbles in pure water are not stable and coalesce upon contact to produce larger bubbles because large bubbles represent a lower energy state than that of small bubbles. A maximum foam concentrate made up of small bubbles occurs when the concentration of the surface active agent (surfactant) is within certain limits of a low concentration. Long chain, surface active molecules are employed. The surface active molecules can be considered as having two parts. These are (1) one or more groups which are repelled by water (hydrophobic) or which have an affinity for the nonwater phase; and (2) one or more groups which are hydrated by water molecules (hydrophylic). The groups which are repelled by water are composed of aggregates of hydrocarbon groups such as those derived from natural fats and oils. The groups which are hydrated are polar (ionogenic) groups, and these may be either anionic or cationic groups. The hydrated groups in some surfactants may be nonionized polar groups in the molecules.

In the interest of economy and effectiveness the preferred surfactant under the present invention, when employed for the flotation of solids in sewage waste, is a member of a series of nonionic surfactants derived by adding one or more elements of the hydrated (hydrophilic) substance, an alkene oxide, to a nonhydrated (hydrophobic) starting material such as nonylphenol. A preferred commercial example of this surfactant employs ethylene oxide as the hydrophilic substance mixed with nonylphenol, and is sold to the trade as IGEPAL-880 by the General Aniline and Film Corporation of New York. This material is described in Technical Bulletin 7543-002, "Igepal CO Nonionic Surfactants" published by the Dyestuff and Chemical Division of the above corporation. Another advantage of the aforesaid surfactant is that it is partially biodegradable which is of particular interest in a sewage disposal system.

The present invention is not limited to the flotation of solids in sewage waste. As a general guide, the nature of the surfactant must be adjusted to the nature of the solids encountered. However, in all cases a "foam stabilizing" surfactant is required. A surfactant depresses the surface tension of water from about 72 grams/cm., to as low as 20 grams/cm. To provide a stable foam, the foam stabilizing surfactant should depress the surface tension to about 40 grams/cm., and the surfactant selected should have at least this quality. The stability action results from the fact that a foam stabilizing surfactant inhibitors drainage from between the bubbles and hence prevents bubble contact and coalescence. The solution between the bubbles becomes more concentrated after some initial drainage, which acts to provide the protective interbubble film.

Another surfactant example is a soluble methylcellulose known as Methocel 65 HG produced by the Dow Chemical Co. of Midlands, Michigan. This is a nonionic surfactant possessing moderate surface and interfacial tension values that facilitate emulsification and bubble formation. This surfactant is derived from cellulose and contains a basic repeating structure of anhydroglucose units. Methocel HG is formed by treating alkali cellulose with methyl chloride and propylene oxide to obtain a hydroxypropoxyl substitution on anhydroglucose polymeric units, which substituent may be considered to form a propylene gylcol ether of cellulose. The powdered reaction product contains about 27-30 percent methoxyl and 4-7.5 percent of the substituent.

OPERATION

The manner in which the concentrate 50 of the present invention receives a portion of the activated sludge from secondary settling (which portion is designated as waste sludge) from line 40, concentrates the waste sludge and feeds it directly to the anaerobic digester 18 (instead of returning it to primary settling as in the prior art) was previously described in connection with FIG. 1.

The operation of the foamer has just been described and so long as the proper quantities of surfactant air and water are admitted to the foamer, the required quantity of stable, fine bubble foam will be generated and introduced by means of the pipe T 42 into the incoming waste sludge line 40 for the concentrator. The various flow quantities and other operational criteria selected for the operation of a pilot plant will be given by way of example at the end of this detailed description.

As the fine bubble, stable foam F leaves the foamer through the line 45 and joins the incoming waste sludge in line 40, the fine bubbles of the foam were intimately mixed with the incoming waste sludge and become attached to the solids of the sludge. This mixture is conducted by the line 48 into the concentrator (FIG. 2). This intimate precontacting of the foam and suspension (waste sludge) continues as the mixture is pumped through the flexible line 94 and on to the release or diffusing nozzle 90. The method of attachment of the bubble to the solids to the sludge probably includes a physical entrainment of the bubbles in the fibrous structure of the solids.

Within the diffusing nozzle 90, the fine bubbles B of the foam F rise at a faster rate than the rate of upward flow of the waste sludge and the array of fine bubbles, all rising, forms a diverging pattern eventually spreading out so as to substantially cover a substantial area within the baffle cone 80. In so rising, and having previously made intimate contact with and become attached to solids in the incoming waste sludge suspension, the fine bubbles B act as buoyant members and effectively lift and float the attached and entrained suspended solids to the surface of the liquid L, forming the sludge blanket S previously described.

In the meantime, the vacuum pickup head 94, subjected to the action of the pump P3, will be rotated (along with the hood 116) by the motor 111 and will skim off a depth of the sludge blanket S as determined by the adjustment of the nut 140, all as previously explained. The sludge S thus picked up, moves down through the vertical pipe 98, through the swivel joint 107 and out pipe 54 under the action of the pump P3. Thus the pump P3 introduces a concentrated sludge into the anaerobic digester 18, as previously described, (FIG. 1).

The clarifier liquid L in the tank spills over the upper edge of the cylindrical tank wall 72 into the collector channel 78 and is hence directed by means of pipes 56, 58 back to the incoming raw sewage line 10 (FIG. 1). The various controls for the surfactant air source and the clarified effluent (water) that has returned to the foamer 44 are adjusted with the instrumentation provided in order to match the foam generation characteristics of the foamer 44 with the flow rate of the waste sludge entering the pipes 40, 48 in the installation.

EXAMPLE OF PILOT PLANT O operation

Concentrator
    Capacity of Tank 70—750 gallons.
    Flow rate of incoming sludge—600 gal./hr.
    percent solids of incoming sludge—0.75 percent by weight.
    percent solids of concentrated sludge—4.0 percent by weight.
    r.p.m. of vacuum head 94—0.2 r.p.m.

Foamer
    Surfactant employed—IGEPAL 880.
    Flow rate of surfactant—60 grams/hr.
    Air pressure to Foamer—4 p.s.i.g.
    Flow rate of air—9.0 cu. ft./hr.
    Flow rate of water (line 60)—24 gal./hr.
    r.p.m. of propeller—4,000 r.p.m.

Although the best mode contemplated for carrying out the present invention has been herein shown and described, it will be apparent that modification and variation may be made without departing from what is regarded to be the subject matter of the invention.

What we claim is:

1. The method of concentrating sewage sludge or the like comprising the steps of shear mixing water, a surfactant and air to form a foam of fine air bubbles with said bubbles having surfactant reinforced films; introducing the foam into a stream of suspended sludge for providing initial contact and attachment between the bubbles and the solids in the stream; releasing the mixed foam and suspension substantially without throttling it into a flotation tank that is substantially at atmospheric pressure to cause the previously entrained fine bubbles to further capture and to float suspended solids to the surface of the suspension in said tank; and separately removing the floating solids and the clarified suspension from the tank.

2. The method of claim 1, comprising the step of isolating the zone of suspension release from the zone of clarified suspension removal while providing for flow of clarified suspension between said zones.

3. In apparatus for clarifying a liquid suspension of solids including a flotation tank, an open bottom solids baffle extending downwardly a substantial distance within said tank, inlet means cooperatively associated with said tank for introducing the incoming liquid suspension of solids into said tank means within said baffle for releasing said liquid suspension of solids from said inlet means, means for introducing air into said inlet means, means for introducing clarified liquid into said inlet means, means for withdrawing floating solids from within said baffle, and means for withdrawing clarified liquid from said tank; the improvement comprising:

a closed chamber and rotor assembly having a plurality of relatively movable turbulence-producing elements including rotor blades and stator blades defining a shear-type foamer, means containing a supply of surfactant, said air and clarified liquid introducing means including a connection to said foamer, means connecting said surfactant supply to said foamer, means controlling the introduction, respectively, of predetermined quantities of said liquid, said surfactant, and air into said shear-type foamer to produce a foam mass of small, surfactant-shielded air bubbles entrained in said liquid and, wherein said air and clarified liquid introducing means further includes a connection between said shear-type foamer and said inlet means thereby to permit flow of said foam mass thereto, said connection to said inlet means being disposed at a point thereof upstream from said tank, thereby to permit said foam mass bubbles to mix with and attach to the suspended solids of said liquid suspension prior to release thereof by said releasing means.

4. The apparatus of claim 3, wherein said releasing means for the liquid suspension of solids and admixed foam mass comprises a dispersing conical diffuser having a mouth that is subjacent the liquid level in the tank, and wherein the body of liquid above said diffuser mouth is unobstructed by baffle means.

5. The apparatus of claim 3, wherein said shear-type foamer further comprises a fixed shroud within and spaced from the walls of said closed chamber, and wherein said stator blades are radially disposed inside said shroud, said rotor blades comprise a propeller within said shroud adjacent to said stator blades, and means for driving said propeller.

6. The apparatus of claim 3, wherein said surfactant is partially biodegradable for use in sewage disposal systems.

7. The apparatus of claim 6, wherein said surfactant comprises a mixture of an alkene oxide with a high molecular weight phenol.

8. The apparatus of claim 6, wherein the principal active ingredient of said surfactant is a soluble methylcellulose.

* * * * *

PO-1050
(5/69)

UNITED STATES PATENT OFFICE
CERTIFICATE OF CORRECTION

Patent No. 3,642,617      Dated February 15, 1972

Inventor(s) EDWIN H. BRINK et al

It is certified that error appears in the above-identified patent and that said Letters Patent are hereby corrected as shown below:

Col. 2, line 20, underline "as bubbles".
Col. 3, line 55, change "seen" to --seed--.
Col. 4, line 68, change "Level" to --level--.
Col. 5, line 51, delete "and".
Col. 7, line 24, change "inhibitors" to --inhibits--.
Col. 8, line 18, change "clarifier" to --clarified--; line 29, change "EXAMPLE OF PILOT PLANT O operation" to --EXAMPLE OF PILOT PLANT OPERATION--.

Signed and sealed this 19th day of September 1972.

(SEAL)
Attest:

EDWARD M. FLETCHER, JR.      ROBERT GOTTSCHALK
Attesting Officer      Commissioner of Patents